United States Patent
Haswarey et al.

(10) Patent No.: US 11,800,350 B1
(45) Date of Patent: Oct. 24, 2023

(54) ENHANCED ACCESS POINT NAME RESOLUTION SUPPORT FOR MOBILE VIRTUAL NETWORK OPERATORS

(71) Applicant: United States Cellular Corporation, Chicago (IL)

(72) Inventors: Bashir A. Haswarey, Elmhurst, IL (US); Mohammad Abu-Samra, Orland Park, IL (US); Narothum Saxena, Hoffman Estates, IL (US); Michael S. Irizarry, Barrington Hills, IL (US)

(73) Assignee: United States Cellular Corporation, Chicago, IL (US)

( * ) Notice: Subject to any disclaimer, the term of this patent is extended or adjusted under 35 U.S.C. 154(b) by 0 days.

(21) Appl. No.: 17/939,538

(22) Filed: Sep. 7, 2022

(51) Int. Cl.
*H04W 8/26* (2009.01)
*H04L 61/5046* (2022.01)
*H04W 76/12* (2018.01)
*H04W 76/11* (2018.01)

(52) U.S. Cl.
CPC ............ *H04W 8/26* (2013.01); *H04L 61/5046* (2022.05); *H04W 76/11* (2018.02); *H04W 76/12* (2018.02)

(58) Field of Classification Search
CPC ........ H04W 8/26; H04W 76/11; H04W 76/12
See application file for complete search history.

(56) References Cited

U.S. PATENT DOCUMENTS

| | | | |
|---|---|---|---|
| 8,213,934 B2 * | 7/2012 | Tsirtsis | H04W 8/04 455/435.1 |
| 10,951,575 B1 * | 3/2021 | Bertz | H04W 88/16 |
| 2022/0046520 A1 * | 2/2022 | Takano | H04W 48/20 |

* cited by examiner

*Primary Examiner* — Bryan Y Lee
(74) *Attorney, Agent, or Firm* — Leydig, Voit & Mayer, Ltd.

(57) ABSTRACT

A system and method are described that are carried out by a core network element of a host mobile carrier core network to perform an access point name resolution to facilitate establishing a session between a user equipment and a target packet gateway (PGW) of a mobile virtual network operator (MVNO). The method includes receiving a connection request from a user equipment identified as falling within particular ranges of mobile subscriber identity number (MSIN) values corresponding to user equipment of hosted MVNOs. The connection request includes: an international mobile subscriber identity (IMSI), and an access point name (APN). The method further includes establishing an MVNO identifier from the provided IMSI and thereafter generating an MVNO-specific APN by appending the MVNO identifier to the APN. The method further includes submitting a name resolution request including the MVNO-specific APN to a naming service server.

20 Claims, 2 Drawing Sheets

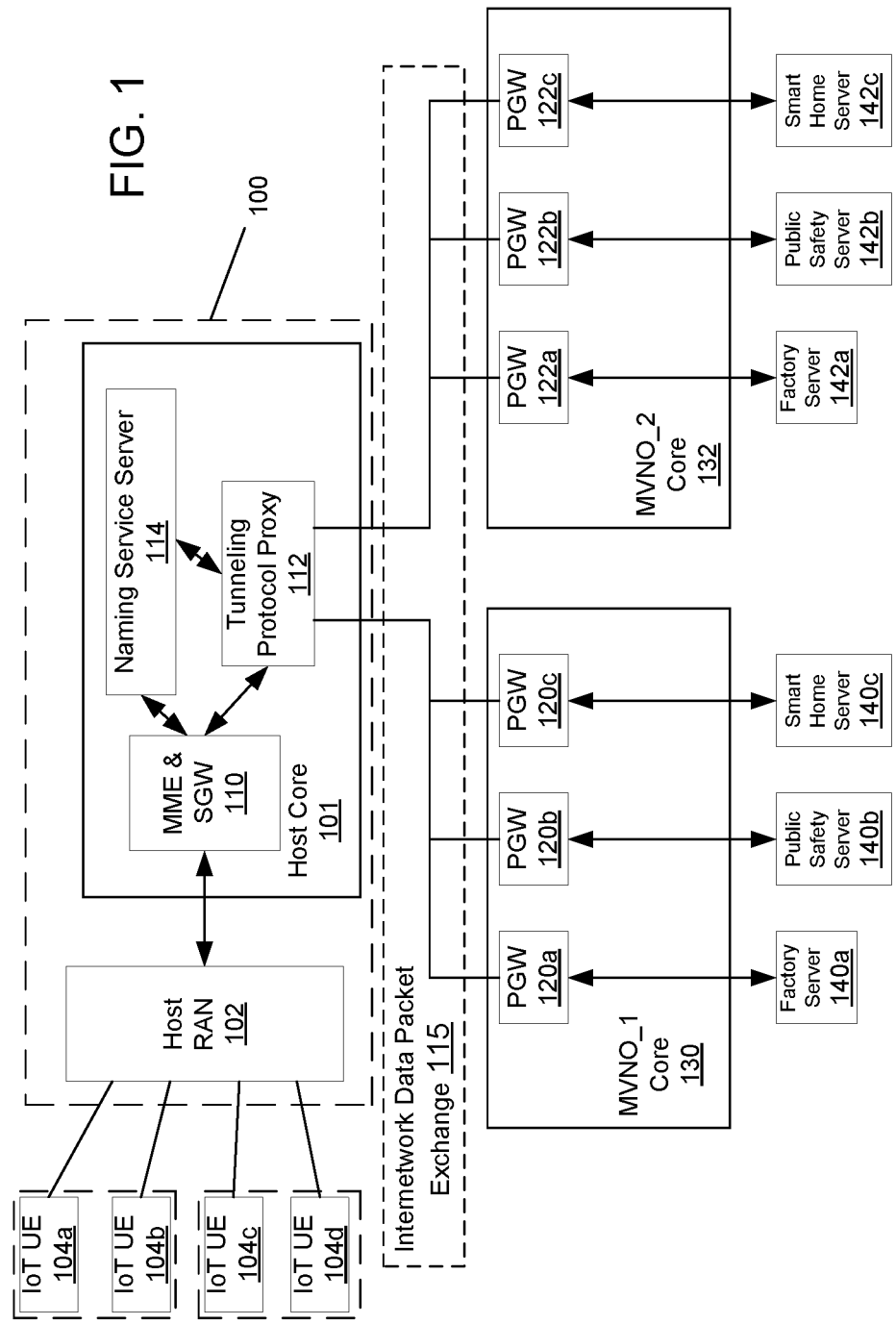

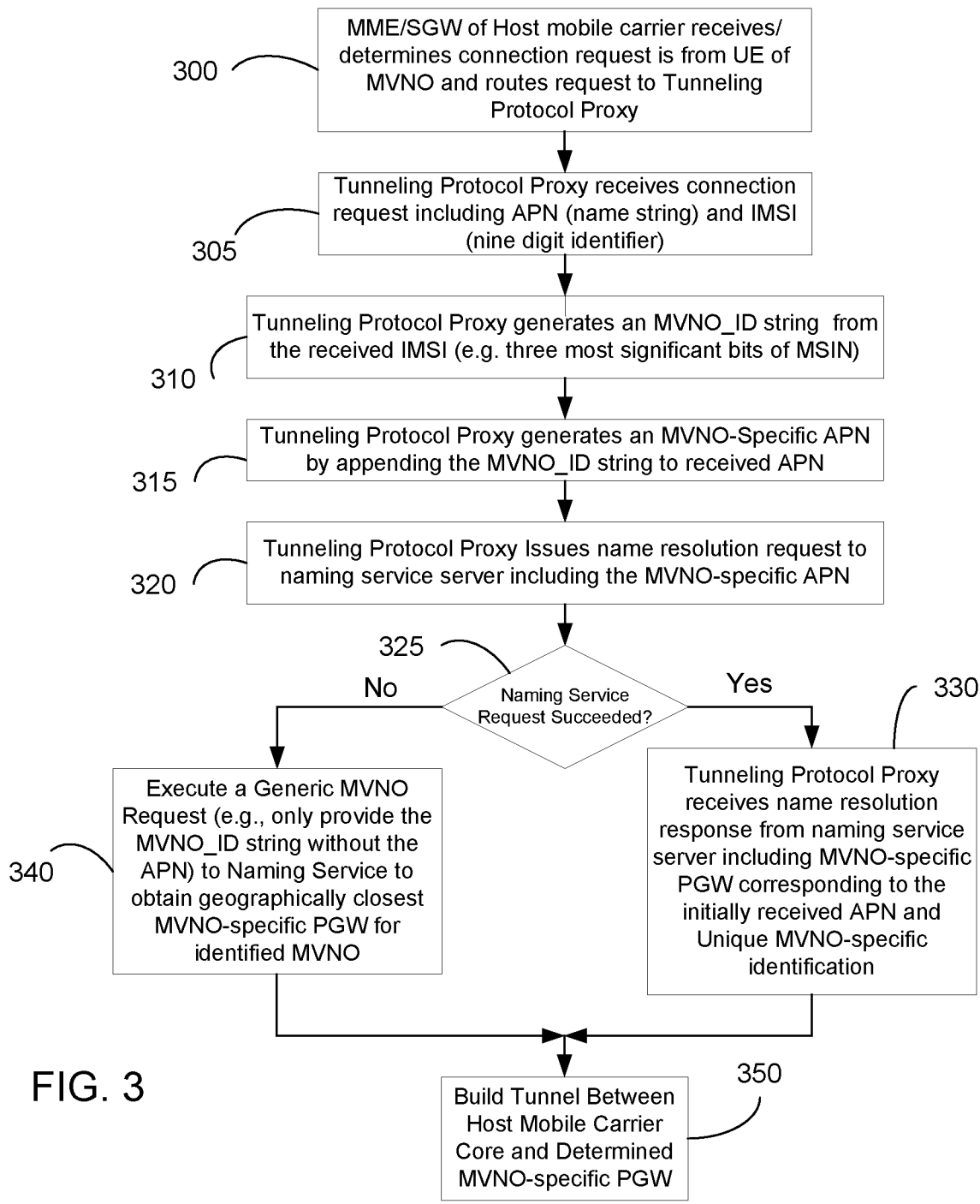

ated with a second MVNO (MVNO_2).

ENHANCED ACCESS POINT NAME RESOLUTION SUPPORT FOR MOBILE VIRTUAL NETWORK OPERATORS

FIELD OF THE INVENTION

The present disclosure generally relates to mobile wireless communications. More particularly, the present disclosure is directed to enhanced access point name resolution for connection requests to mobile virtual network operator packet target gateways.

BACKGROUND OF THE INVENTION

Mobile wireless network operator (MNO) carriers are known to provide radio access network (RAN) support for mobile virtual network operators (MVNOs). In a particular arrangement of interest herein, a heavy MVNO includes a fully operational core network but does not own/operate RAN infrastructure or may own/operate a RAN with limited coverage. In areas where cellular service is needed, the heavy MVNO relies upon an MNO's RAN and is assigned international mobile subscriber identity (IMSI) blocks leased from a host MNO (also referred to herein as a host mobile carrier). When the MNO's network receives a connection request, including an access point name (APN), from a user equipment of the MVNO, upon authentication, the APN is first resolved to the host General Packet Radio Service (GPRS) tunneling protocol proxy that, in turn, uses the APN to select the target packet gateway (PGW) of the heavy MVNO and establishes a tunnel between the user equipment and the target PGW.

By way of a more particular example, the user equipment is an Internet of Things (IoT) appliance, and the host GPRS tunneling protocol proxy establishes a tunnel connection between the IoT appliance and a particular one of multiple PGWs supported by a particular one of multiple hosted MVNOs. Additionally, each of the multiple hosted MVNOs define a mapping between APNs provided by IoT appliances and corresponding MVNO-specific PGWs.

A potential problem for the host GPRS tunneling protocol proxy hosting multiple MVNO enterprises seeking RAN support for providing mobile wireless connectivity between IoT appliances and MVNO-specific PGWs is the presence of re-used APN names across different ones of the multiple hosted MVNOs. For example, each of two distinct hosted MVNOs include the APN "factory.net" in their respective domain name resolution tables. In such case, a name resolution request submitted by the host GPRS tunneling protocol proxy to a domain name resolution service will fail as there are two distinct addresses corresponding to the provided "factory.net" address. This problem is heightened as the name resolution service the host mobile carrier supports use of wild card characters (i.e. mapping all *.net to a specific PGW of the enterprise). Given naming conventions used by industries (and the information technology service providers configuring enterprise connectivity), the potential for APN name conflicts between MVNOs is substantial.

One solution is to force each MVNO to provide globally unique APNs for resolving provided APNs to target PGWs. However, requiring MVNOs to provide globally unique APNs could require MVNOs to revise/reconfigure name conventions of the associated IoT devices served by the MVNOs to ensure the APNs can be successfully resolved in a multi-MVNO hosting environment.

SUMMARY OF THE INVENTION

A system and method are disclosed that are carried out by a core network element of a host mobile carrier core network to perform an access point name resolution to facilitate establishing a session between a user equipment and a target packet gateway (PGW) of a mobile virtual network operator (MVNO). The method carried out by the core network element includes receiving a connection request from a user equipment identified as falling within particular ranges of mobile subscriber identity number (MSIN) values corresponding to user equipment of hosted MVNOs. The connection request includes: an international mobile subscriber identity (IMSI), and an access point name (APN). The method further includes establishing an MVNO identifier from the provided IMSI and thereafter generating an MVNO-specific APN by appending the MVNO identifier to the APN. The method further includes submitting a name resolution request including the MVNO-specific APN to a naming service server; and receiving a name resolution response, corresponding to the name resolution request, from the naming service server.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 1 is a schematic diagram of an exemplary mobile wireless network radio network environment including a plurality of MVNOs served by a host mobile carrier for implementing the features of the present disclosure;

FIG. 2 is a schematic diagram summarizing fields of an international mobile subscriber identity (IMSI) including particular sub-fields for identifying an MVNO to facilitate resolving a provided access point name (APN) to a target packet gateway of the MVNO; and FIG. 3 is a flow diagram summarizing an exemplary set of operations carried out by a tunneling protocol proxy to resolve a provided APN to target packet gateway in accordance with the present disclosure.

DETAILED DESCRIPTION OF THE DRAWINGS

A system, in accordance with the present disclosure, includes a host mobile carrier hosting several MVNOs that potentially use overlapping APN names that need to be resolved by a naming service of the host mobile carrier to a single MVNO-specific packet gateway (PGW). A user equipment of a customer of a particular MVNO issues a connection request to a RAN of the host mobile carrier. The host mobile carrier resolves an APN provided in the connection request to an MVNO-specific PGW by using a unique identifier assigned to the user equipment to determine an associated MVNO, and thereafter access MVNO-specific APN name resolution entries in a name resolution database associating APN names to target PGWs. The host mobile carrier thereafter builds a tunneling session, within a core network of the host mobile carrier, to connect the uniquely identified user equipment to the MVNO-specific PGW determined by the MVNO-specific resolution of the APN name provided by the uniquely identified user equipment.

Turning to FIG. 1, an exemplary environment is schematically depicted where a host mobile carrier 100, including a host core network 101 and a host RAN 102, hosts multiple MVNOs. User equipment 104a and 104b are associated with a first MVNO (MVNO_1). User equipment 104c and 104d are associated with a second MVNO (MVNO_2).

In accordance with the illustrative example, the MVNO_1 and MVNO_1 are partially complete mobile network operators. As such, the host mobile carrier 100 provides RAN services to user equipment associated with the MVNO_1 and MVNO_2. The user equipment 104*a*-*d* issue connection requests and connect to their corresponding core networks (MVNO_1 core 130 and MVNO_2 core 132) through the host RAN 102 and the host core 101 of the host mobile carrier 100.

With continued reference to FIG. 1, simplified depictions are provided of the MVNO_1 core 130 and the MVNO_2 core 132 to depict and demonstrate the particular features of the present disclosure relating to resolving otherwise overlapping conflicting APNs used by different MVNOs in a multiple MVNO hosting arrangement by the host mobile carrier 100. The MVNO_1 core 130 is accessed via a plurality of PGWs, including PGWs 120*a*, 120*b* and 120*c* through which user equipment are connected to services provided by particular servers. In the illustrative example, PGW 120*a* provides access to factory server 140*a*, PGW 120*b* provides access to factory server 140*b*, and PGW 120*c* provides access to factory server 140*c*. Similarly, the MVNO_2 core is accessed via a plurality of PGWs, including PGW 122*a*, 122*b* and 122*c* through which user equipment are connected to services provided by particular servers. In the illustrative example, PGW 122*a* provides access to factory server 142*a*, PGW 122*b* provides access to factory server 142*b*, and PGW 122*c* provides access to factory server 142*c*.

In accordance with the illustrative example, a connection request by any one of the user equipment 104*a*-*d* is passed via the host ran 102 to a mobility management entity (MME) and source gateway (SGW) 110 of the host core network 101. The request, including both a unique mobile subscriber identification (e.g. an international mobile subscriber identity—IMSI) and an access point name string (e.g. access point name—APN) is received and processed by the MME/SGW 110.

Turning briefly to FIG. 2, an illustrative example is provided of an IMSI including a mobile country code (MCC) 210, a mobile network code 220, and a mobile subscriber identity number (MSIN) field 230. In an illustrative example, the MCC field is three numbers (digits) long, the MNC field 220 is three numbers long, and the MSIN is nine digits long. In an illustrative example, each MVNO is uniquely identified by three digits (e.g. three most significant bits) of the MSIN, referred to herein as an MVNO identifier (MVNO_ID). Thus, each MVNO is allocated a block of 1 million IMSI (each having a unique MSIN determined by the lowest 6 digits of the MSIN). Different numbers of digits can be allocated for the MVNO_ID and the corresponding block of assignable MVNO-specific user equipment identifiers in accordance with other implementations of the current disclosure.

The MME/SGW 110 is configured, for example, to carry out well known on-network authentication via each MVNO's respective home subscriber server (HSS), location/session management. In accordance with illustrative examples, the MME/SGW 110 is configured to recognize and selectively route requests from hosted MVNO user equipment, which are identified by particular ranges (e.g. 1 million per distinct MVNO identifier) of MSIN values corresponding to user equipment of hosted MVNOs, to a tunneling protocol proxy 112 (e.g. a GPRS Tunneling Protocol Proxy). By way of example, the MME/SGW 110 is configured with Name Authority Pointer (NAPTR) records that resolve the provided APN and IMSI to an instance of the tunneling protocol proxy 112 geographically closest to the requesting one of the user equipment 104*a*-*d*.

With continued reference to FIG. 1, the tunneling protocol proxy 112, by way of example, is configured set up a session, through the host core network 101, connecting the user equipment to a corresponding PGW of an MVNO associated with the requesting one of the user equipment 104*a*-*d*. By way of example, the tunneling protocol proxy 112 is configured to receive a combination of an IMSI (see FIG. 2) and an APN extracted from a connection request issued by a user equipment associated with one of the hosted MVNOs. The tunneling protocol proxy 112 is configured to establish an MVNO_ID (e.g., identifier string) from the provided IMSI. In accordance with the above-provided illustrative example, where each MVNO is assigned a unique three digit combination that is inserted at the three most significant digits of the MSIN field of the IMSI, the tunneling protocol proxy 112 generates an MVNO_ID string by joining the unique three digit MVNO identifier (e.g., "102") with a string "mvno" to render an MVNO identifier of "mvno102" for purposes of issuing a naming service resolution request.

In accordance with a further aspect of the illustrative example, the tunneling protocol proxy 112 is further configured to generate an MVNO-specific name by appending the aforementioned MVNO_ID string (generated by the proxy 112 from the IMSI) to the APN previously received from the MME/SGW 110. For example, the MVNO_ID "mvno102" is appended to an APN string "factory.net" to render an MVNO-specific APN of "factory.net.mvno102".

In summary of the above, in accordance with the present disclosure, the tunneling protocol proxy 112 is configured to initially establish a MVNO_ID string based upon the provided IMSI (e.g. the three most significant bits of the MSIN in the received request from the user equipment). The tunneling protocol proxy 112 thereafter creates an MVNO-specific APN for submission/resolving by a naming service server 114 (domain name server—DNS) by appending the MVNO_ID string to the (non-MVNO-specific) APN initially received by the proxy 112.

It follows that the naming service server 114 is configured to resolve the MVNO-specific APNs generated/submitted by the tunneling protocol proxy 112. Such functionality may be supported by any of a variety of name resolution mechanisms and data structures including maintaining a plurality of MVNO-ID-specific tables with APN-to-PGW associations. In such case, the naming service server 114 initially uses the MVNO_ID string to select an MVNO-specific APN-to-PGW mapping table. The APN is thereafter applied to the selected MVNO-specific APN-to-PGW mapping table to identify an MVNO-specific target PGW, at which a tunnel through the host core 101, will terminate.

Upon receiving the MVNO-specific target PGW from the naming service server 114, the tunneling protocol proxy 112 uses the originally received IMSI and originally received APN string when forwarding a create session request via an internetwork data packet exchange 115 to the MVNO-specific target PGW.

It is further noted that, in accordance with a particular illustrative example, the tunneling protocol proxy 112 is configured to issue, in the case of a naming service failure on an MVNO-specific APN, a generic request including only the MVNO_ID string to the naming service server 114 that resolves to a geographically nearest MVNO-specific PGW for the requesting user equipment—in accordance with Name Authority Pointer (NAPTR) procedures.

Having described an exemplary system for implementing an enhanced APN support arrangement for the host mobile carrier 100 hosting a plurality of MVNOs, attention is directed to FIG. 3 summarizing a set of exemplary operations performed by a core network element of the host mobile carrier 100 to implement the enhanced APN resolution scheme described herein above with reference to FIGS. 1 and 2. During 300, the MME/SGW 110 recognizes and selectively routes a request from a hosted MVNO user equipment (e.g. UE 104*a*), which is identified as falling within particular ranges (e.g. 1 million per distinct MVNO identifier) of MSIN values corresponding to user equipment of hosted MVNOs, to the tunneling protocol proxy 112 (e.g. a GPRS Tunneling Protocol Proxy). By way of example, the MME/SGW 110 is configured with Name Authority Pointer (NAPTR) records that resolves the provided APN and IMSI to an instance of the tunneling protocol proxy 112 geographically closest to the requesting one of the user equipment 104*a-d*.

With continued reference to FIG. 3, during the summarized operations described herein below, the tunneling protocol proxy 112 sets up a session through the host core network 101, connecting the user equipment to a corresponding PGW of an MVNO associated with the requesting one of the user equipment 104*a-d*. By way of example, during 305 the tunneling protocol proxy 112 receives a combination of an IMSI (see FIG. 2) and an APN extracted from a connection request issued by a user equipment associated with one of the hosted MVNOs.

Thereafter, during 310 the tunneling protocol proxy 112 establishes an MVNO_ID (e.g., identifier string) from the provided IMSI. In accordance with the above-provided illustrative example, where each MVNO is assigned a unique three digit combination that is inserted at the three most significant digits of the MSIN field of the IMSI, the tunneling protocol proxy 112 generates an MVNO_ID string by joining the unique three digit MVNO identifier (e.g., "102") with a string "mvno" to render an MVNO identifier of "mvno102" for purposes of issuing a naming service resolution request.

In accordance with a further aspect of the illustrative example, during 315 the tunneling protocol proxy 112 generates an MVNO-specific name by appending the aforementioned MVNO_ID string (generated by the proxy 112 from the IMSI) to the APN previously received from the MME/SGW 110. For example, the MVNO_ID "mvno102" is appended to an APN string "factory.net" to render an MVNO-specific APN of "factory.net.mvno102". Thus, in summary of the above, in accordance with the present disclosure, the tunneling protocol proxy 112 is configured to initially establish a MVNO_ID string based upon the provided IMSI (e.g. the three most significant bits of the MSIN in the received request from the user equipment). The tunneling protocol proxy 112 thereafter creates an MVNO-specific APN for submission to/resolving by a naming service server 114 (domain name server—DNS) by appending the MVNO_ID string to the (non-MVNO-specific) APN initially received by the proxy 112.

Thereafter, during 320, the proxy 112 submits a name resolution request including the MVNO-specific APN to the naming service server 114 that is configured to resolve the MVNO-specific APNs generated/submitted by the tunneling protocol proxy 112. Such functionality may be supported by any of a variety of name resolution mechanisms and data structures including maintaining a plurality of MVNO-ID-specific tables with APN-to-PGW associations. In such case, the naming service server 114 initially uses the MVNO_ID string to select an MVNO-specific APN-to-PGW mapping table. The APN is thereafter applied to the selected MVNO-specific APN-to-PGW mapping table to identify an MVNO-specific PGW to which a tunnel will terminate.

During 325, the proxy 112 receives a name resolution response from the naming service server. If the name resolution succeeded, then control passes to 330. During 330, the proxy 112, upon receiving the MVNO-specific target PGW from the naming service server 114, uses the originally received IMSI and originally received APN string to forward a create session request to the MVNO-specific target PGW.

During 325, if the proxy 112 receives a name resolution "failed" response, then control passes to 340. During 340, in accordance with a particular illustrative example, the tunneling protocol proxy 112 issues a generic request (including only the MVNO_ID string) to the naming service server 114 that resolves the MVNO_ID to a geographically nearest MVNO-specific PGW for the requesting user equipment—in accordance with Name Authority Pointer (NAPTR) procedures.

During 350, the host core 101 builds a tunnel connection supporting a session between the originally requesting user equipment and the target PGW identified and contacted during the previously executed steps described herein above.

All references, including publications, patent applications, and patents, cited herein are hereby incorporated by reference to the same extent as if each reference was individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method carried out by a core network element of a host mobile carrier core network to perform an access point name resolution to facilitate establishing a session between a user equipment and a target packet gateway (PGW) of a mobile virtual network operator (MVNO), the method comprising: receiving a connection request from a user equipment identified as falling within particular ranges of mobile subscriber identity number (MSIN) values corresponding to user equipment of hosted MVNOs, wherein the connection request includes: an international mobile subscriber identity (IMSI), and an access point name (APN); and establishing an MVNO identifier (MVNOID) from the provided IMSI; generating an MVNO-specific APN by appending the MVNO identifier to the APN; submitting a name resolution request including the MVNO-specific APN to a naming service server; and receiving a name resolution response, corresponding to the name resolution request, from the naming service server.

2. The method of claim 1, wherein the name resolution response provides information for an MVNO-specific target PGW; and wherein the core network element uses the received IMSI and originally received APN string to forward a create session request to the MVNO-specific target PGW.

3. The method of claim 2, wherein the information for the MVNO-specific PGW is used by the host mobile carrier core network to build a tunnel connection supporting a session between the user equipment and the MVNO-specific target PGW.

4. The method of claim 1, wherein the core network element is a General Packet Radio Service (GPRS) tunneling protocol proxy.

5. The method of claim 1, wherein each MVNO is assigned a unique three digit combination that is inserted at the three most significant digits of an MSIN field of the IMSI, and wherein the establishing an MVNO identifier comprises generating an MVNO identifier character string by joining the unique three digit MVNO identifier with a further characterizing string to render the MVNO identifier for purposes of performing the submitting the name resolution request.

6. The method of claim 1, wherein the MVNO_ID is a character string.

7. The method of claim 1, wherein the request is received from a mobility management entity (MME) that initially receives the request from the user equipment.

8. The method of claim 1, wherein the name resolution response indicates a name resolution failure; and wherein the core network, in response to the name resolution failure, issues a generic request to the naming service server that resolves the MVNO_ID to a geographically nearest MVNO-specific PGW for the requesting user equipment in accordance with Name Authority Pointer (NAPTR) procedures.

9. The method of claim 8, wherein the APN portion of the generic request includes only the MVNO identifier for use by the naming service server to resolve to the geographic nearest MVNO-specific PGW.

10. The method of claim 1 wherein the MVNO-specific identifier is appended to the right side of the APN.

11. A method carried out by a core network element of a host mobile carrier core network to perform an access point name resolution to facilitate establishing a session between a user equipment and a target packet gateway (PGW) of a mobile virtual network operator (MVNO), the method comprising:
receiving a connection request from a user equipment identified as falling within particular ranges of mobile subscriber identity number (MSIN) values corresponding to user equipment of hosted MVNOs, wherein the connection request includes:
an international mobile subscriber identity (IMSI), and
an access point name (APN); and
establishing an MVNO identifier (MVNO ID) from the provided IMSI;
generating an MVNO-specific APN by appending the MVNO identifier to the APN;
submitting a name resolution request including the MVNO-specific APN to a naming service server; and
receiving a name resolution response, corresponding to the name resolution request, from the naming service server.

12. The system of claim 11 wherein the name resolution response provides information for an MVNO-specific target PGW; and wherein the core network element uses the received IMSI and originally received APN string to forward a create session request to the MVNO-specific target PGW.

13. The system of claim 12 wherein the information for the MVNO-specific PGW is used by the host mobile carrier core network to build a tunnel connection supporting a session between the user equipment and the MVNO-specific target PGW.

14. The system of claim 11, wherein the core network element is a General Packet Radio Service (GPRS) tunneling protocol proxy.

15. The system of claim 11, wherein each MVNO is assigned a unique three digit combination that is inserted at the three most significant digits of an MSIN field of the IMSI, and wherein the establishing an MVNO identifier comprises generating an MVNO identifier character string by joining the unique three digit MVNO identifier with a further characterizing string to render the MVNO identifier for purposes of performing the submitting the name resolution request.

16. The system of claim 11, wherein the MVNO_ID is a character string.

17. The system of claim 11, wherein the request is received from a mobility management entity (MME) that initially receives the request from the user equipment.

18. The system of claim 11, wherein the name resolution response indicates a name resolution failure; and wherein the core network, in response to the name resolution failure, issues a generic request to the naming service server that resolves the MVNO_ID to a geographically nearest MVNO-specific PGW for the requesting user equipment in accordance with Name Authority Pointer (NAPTR) procedures.

19. The system of claim 18 wherein the APN portion of the generic request includes only the MVNO identifier for use by the naming service server to resolve to the geographic nearest MVNO-specific PGW.

20. The system of claim 11 wherein the MVNO-specific identifier is appended to the right side of the APN.

* * * * *